Patented Jan. 23, 1923.

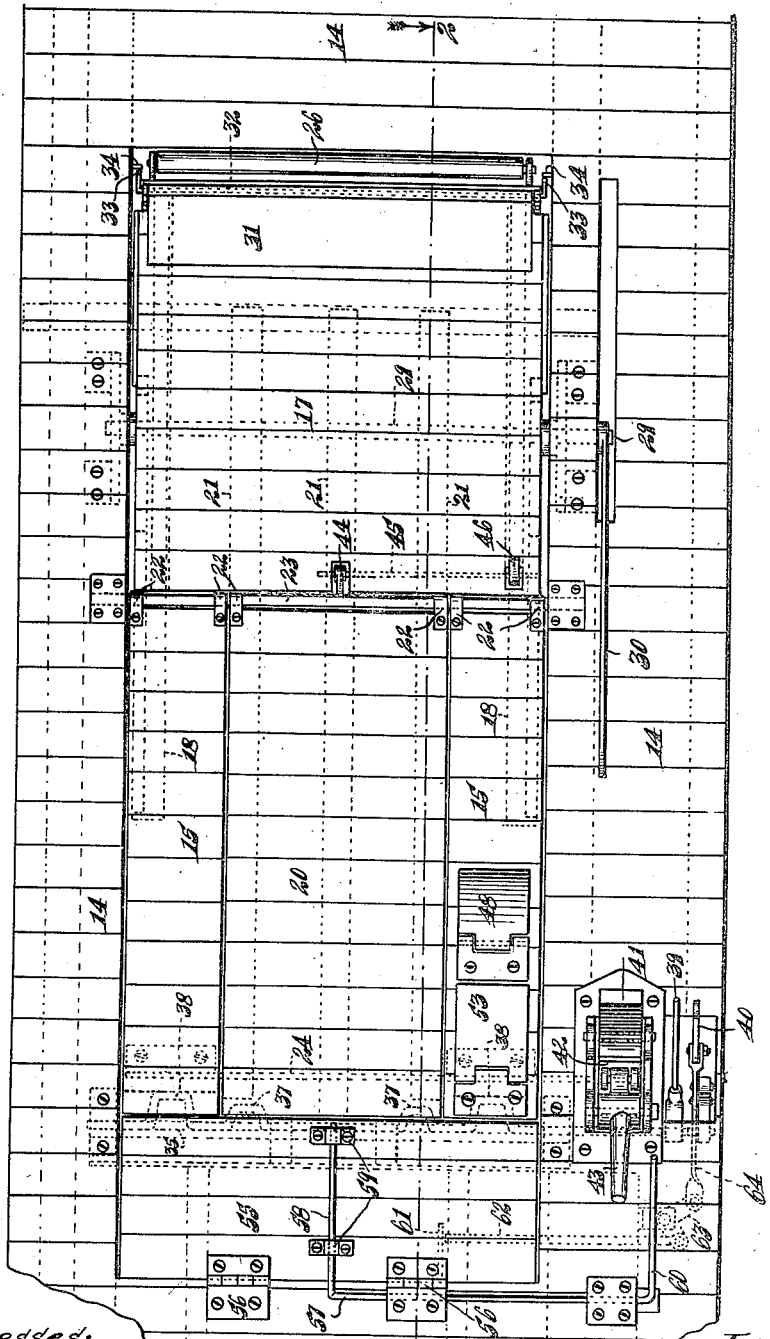

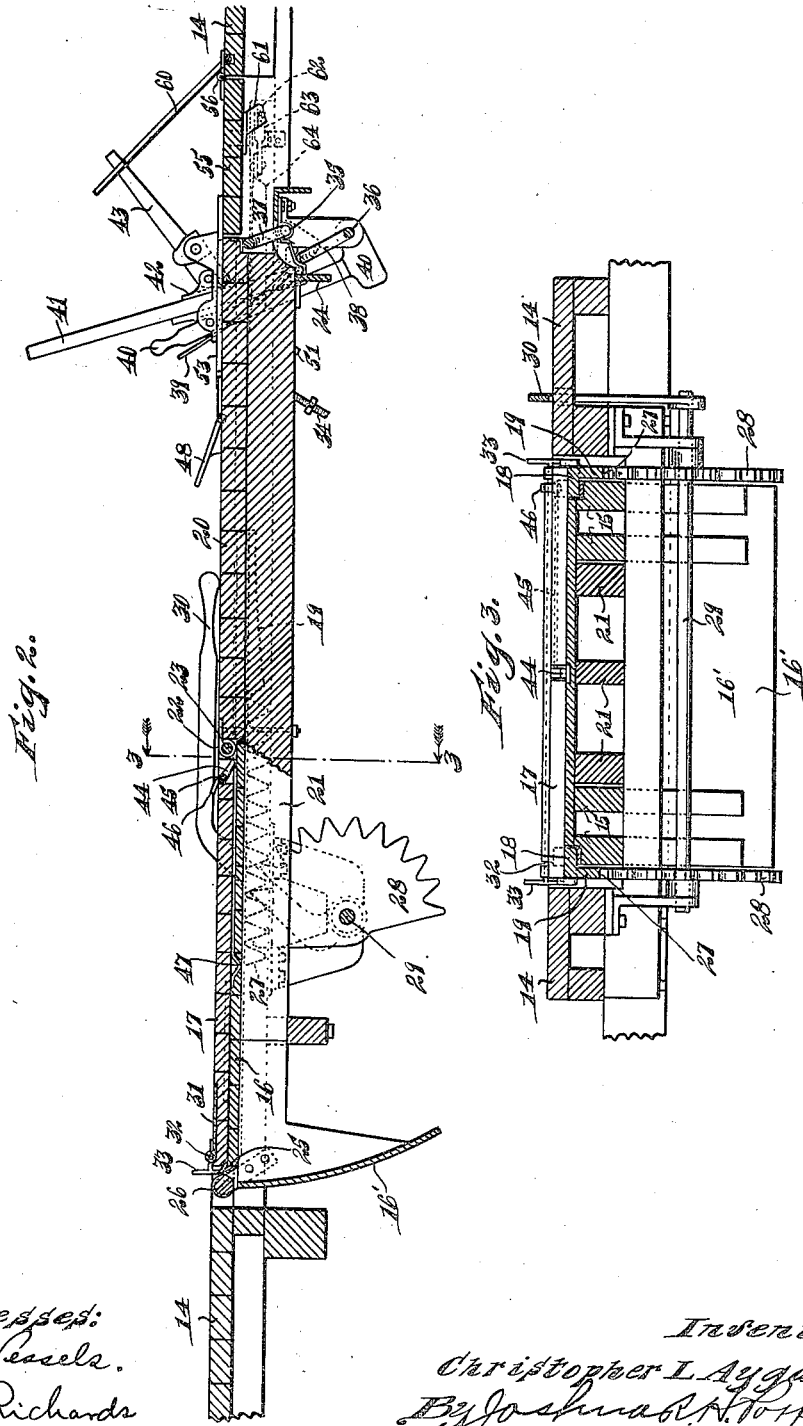

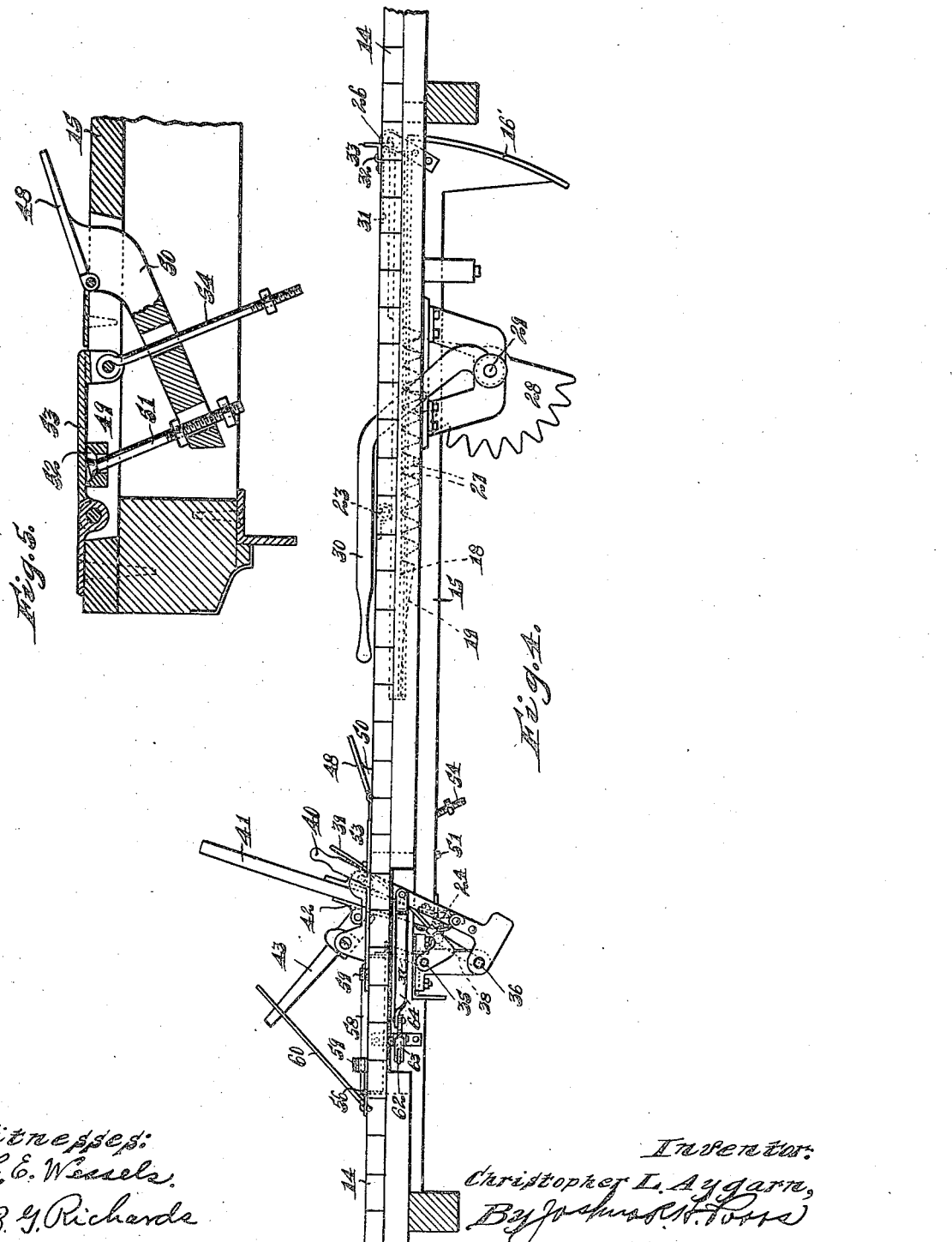

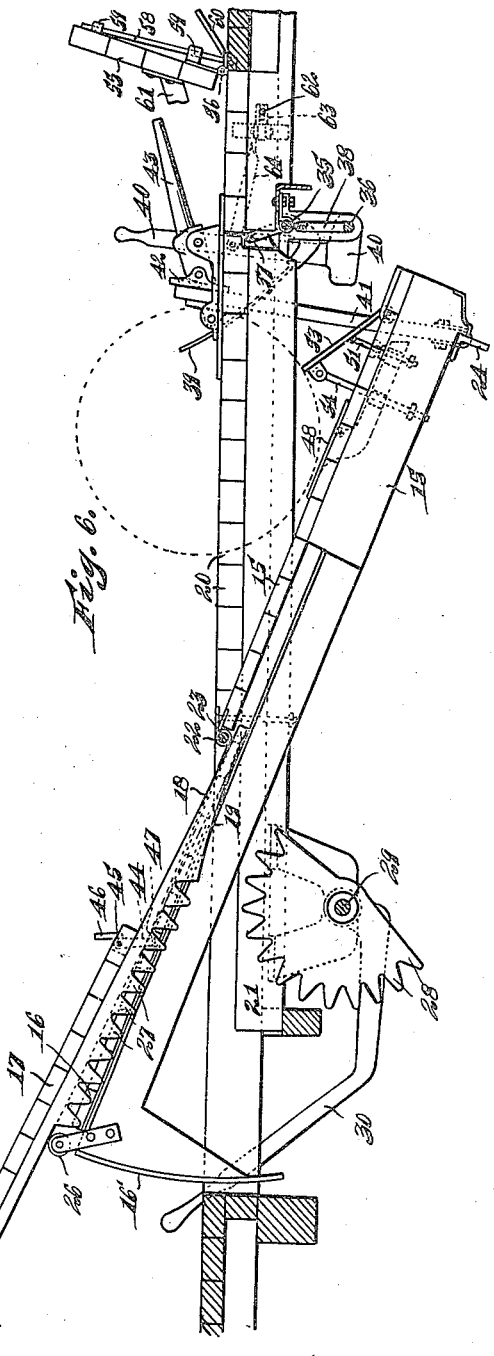

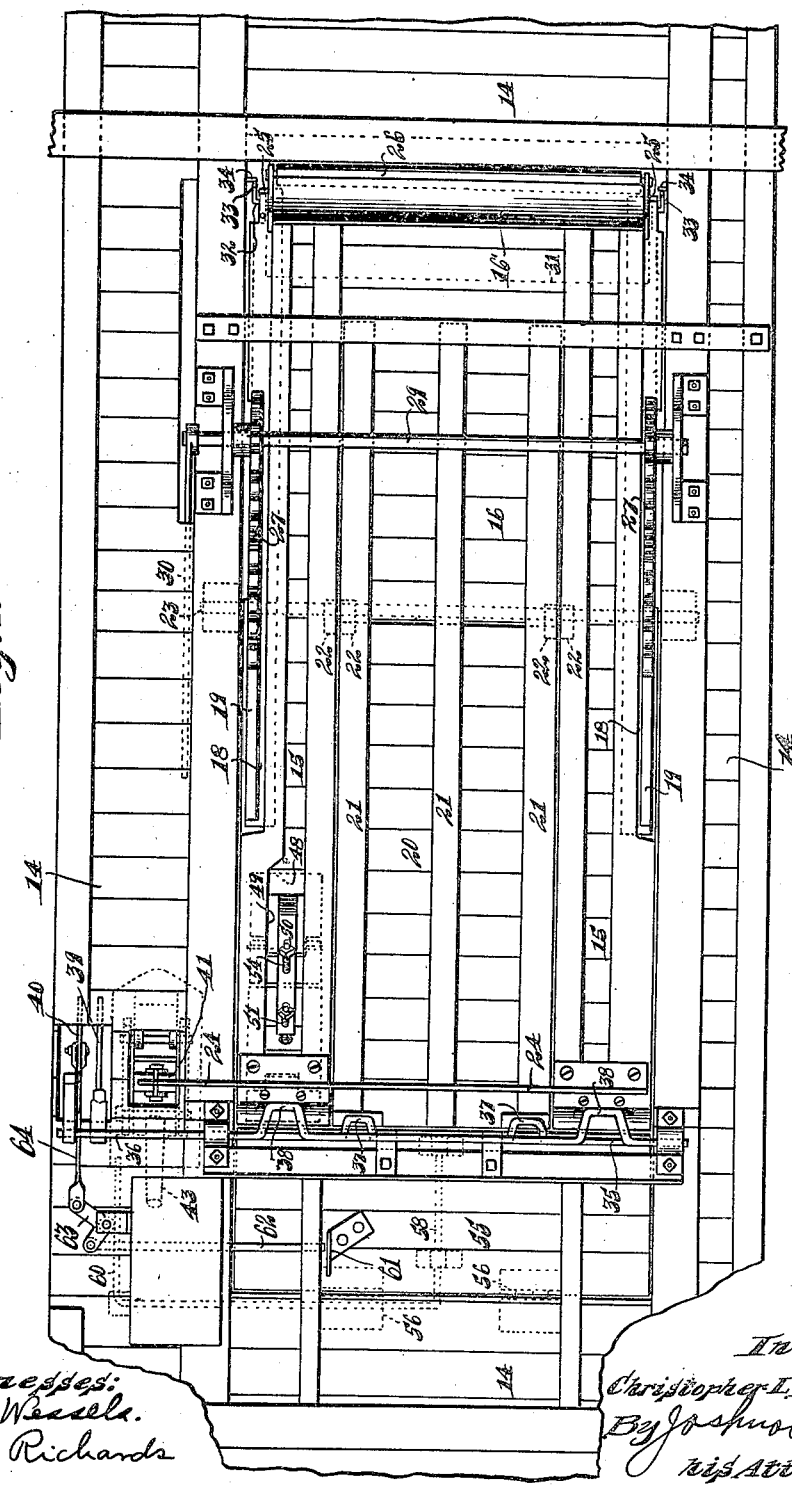

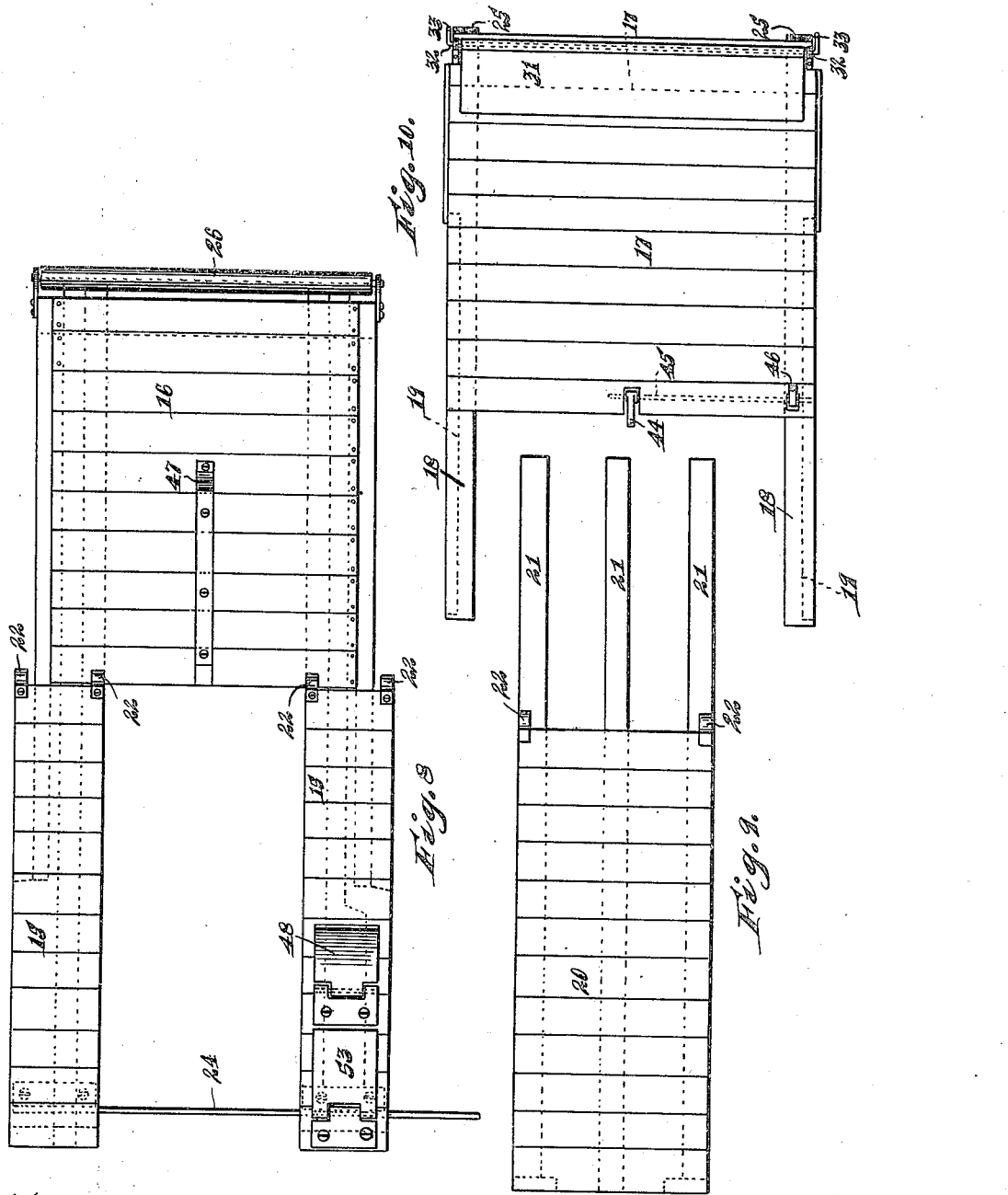

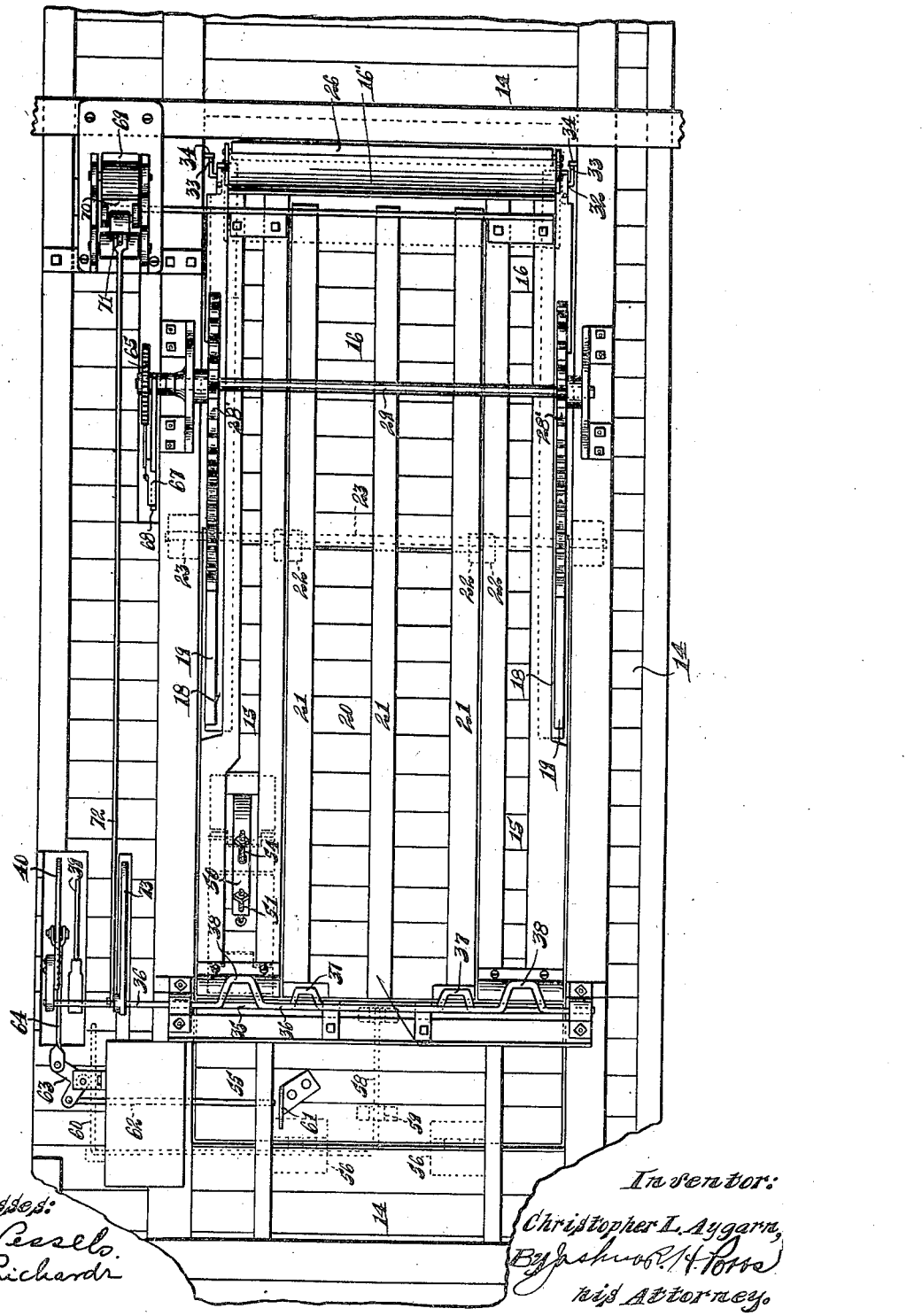

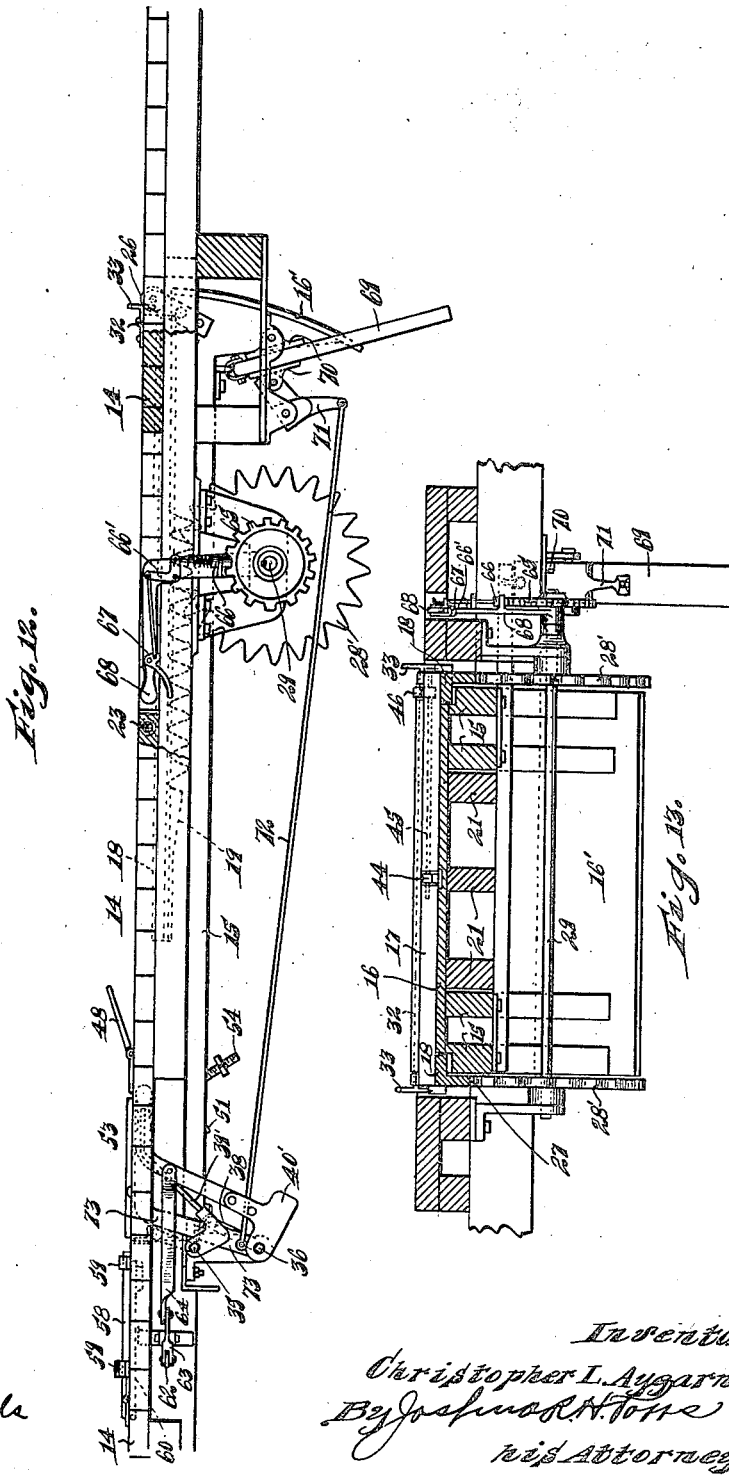

1,442,847

UNITED STATES PATENT OFFICE.

CHRISTOPHER L. AYGARN, OF MORRIS, ILLINOIS, ASSIGNOR, BY MESNE ASSIGNMENTS, TO M. G. AYGARN.

VEHICLE DUMP.

Application filed February 26, 1918. Serial No. 219,207.

*To all whom it may concern:*

Be it known that I, CHRISTOPHER L. AYGARN, a citizen of the United States, and a resident of the city of Morris, county of Grundy, and State of Illinois, have invented certain new and useful Improvements in Vehicle Dumps, of which the following is a specification.

My invention relates to improvements in dumping mechanisms, especially adapted for use in unloading grain wagons, trucks and the like, the object of the invention being to provide an improved construction of this character which is efficient and safe in operation.

The invention consists in the combinations and arrangements of parts hereinafter described and claimed.

The invention will be best understood by reference to the accompanying drawings forming a part of this specification, and in which.

Fig. 1 is a top plan view of a dumping mechanism embodying the invention,

Fig. 2, a section taken on line 2—2 of Fig. 1,

Fig. 3, a section taken on line 3—3 of Fig. 2,

Fig. 4, a longitudinal section of the construction,

Fig. 5, an enlarged detail view of a wheel stop mechanism employed in the construction, Fig. 6, a longitudinal section of the construction shown in dumping position, Fig. 7, a bottom plan view of the construction, Fig. 8, a top plan view of one portion of a dumping support employed in the construction, Fig. 9, a top plan view of another portion of the dumping support, Fig. 10, a top plan view of a third portion of the dumping support, Fig. 11, a bottom plan view of a modified form of construction, Fig. 12, a longitudinal section of the same, and Fig. 13, a transverse section of the same.

The form of construction illustrated in Figs. 1 to 10 inclusive, comprises the usual platform 14 for the purpose, having the usual central opening therein. A dumping support for the vehicles is arranged in this opening, said dumping support comprising wheel tracks or supports 15 having a forward central support 16 rigidly connected therewith but arranged on a lower plane. An extension support 17 is arranged to fit within the recess, formed by depression of support 16, and is provided with rearwardly extending arms or beams 18 slidably fitting under the wheel supports 15 as indicated. The beams or supports 18 are provided with depending lateral flanges 19 which serve to guide the extension 17 in its movements relatively to the portions 15 and 16. The support 16 is provided at its forward end with the usual depending guard or apron 16' adapted to guard or protect the opening when this portion of the support swings upwardly. The space between the wheel tracks 15 is occupied by a small central support 20, having forwardly extending beams or arms 21 fitting under the portion 16, and suitable pivot eyes 22 are arranged at the forward ends of the wheel tracks 15 and support portion 20 to receive a pivot shaft 23 supported on the platform 14 substantially centrally of the dumping opening therein, whereby the rear portions of the dumping support are arranged to swing downwardly and the forward portions to swing upwardly, as indicated. A cross bar 24 is arranged across and below the rear ends of the wheel tracks 15 which, when coupled with the forward extensions 21, permits of swinging of the wheel tracks 15 and portions 16 and 17 independently of the central portion 20, but compels the swinging of all when the central portion 20 swings, the wheel tracks 15 being employed for large vehicles having central free space beneath and all of the supporting portions being employed where small vehicles, sleighs or large automobile trucks having little or no free central spaces beneath, are to be dumped.

The extension 17 is provided at its forward end with beveled contact members 25 adapted to contact with and ride over a roller 26 mounted at the forward edge of platform portion 16, when said extension is forced forwardly. For this purpose the extension 17 is provided on its bottom at each side, with a rack bar 27, meshing with a corresponding segmental gear 28 on a rocker shaft 29 arranged across the bottom of the platform 14, and equipped with an operating handle 30 for rocking the same. A riser 31 in the form of a sheet metal plate, is arranged at the forward end of extension 17, being let into a recess therein, flush with the top surface thereof, said riser being carried by a rocker shaft 32 having T-shaped rocker arms 33 at each end adapted to contact with stop pins 34 on platform 14, whereby, upon forward sliding of the extension 17, the riser 31 is automatically thrown forwardly as indicated in Fig. 6, to provide an inclined surface for facilitating the travel of the vehicle wheels from the dumping platform, said riser being automatically swung or folded back to inoperative position upon withdrawal of said extension, as will be readily understood. By this arrangement it will be observed that when an unusually long vehicle, such as an automobile truck, is being dumped, the extension 17 may be quickly extended to accommodate the same and permit of the ready driving of the truck off of the dumping mechanism. Two rocker shafts 35 and 36 are arranged across the rear portion of platform 14 below the rear ends of support portions 15 and 20, said rocker shafts being provided respectively, with crank arms 37 and 38, adapted to engage suitable shoulders on the corresponding support portions 20 and 15. Operating handles 39 and 40 are provided respectively for shafts 35 and 36, the arrangement being such as to permit of the swinging of said crank arms under their corresponding shoulders to lock the dumping support members against dumping, to permit of the safe placing of the vehicles thereon, and so that said crank arms may be readily withdrawn by manipulating either or both of the operating handles 39 and 40 to permit of dumping swinging of said support. A brake bar 41 is pivotally connected with one end of bar 24 and extends upwardly through a suitable opening in platform 14 and through a suitable braking mechanism 42 operable by an operating lever 43, and whereby suitable friction may be exerted on the bar 41 to control the downward swinging of the dumping support, as will be readily understood.

A stop pawl 44 is secured to a rocker shaft 45 mounted transversely at the rear end of extension 17 and equipped at one end with a foot pedal 46 for manipulating said pawl. A stop recess or well 47 is provided in the support portion 16, to receive the stop pawl 44 to lock the extension 17 in its extended position, said pawl being readily releasable by stepping upon the foot pedal 46, as will be readily understood.

Each of the track members 15 is equipped with a suitable wheel stop comprising a wheel rest 48 pivotally mounted in a slot 49 and provided with a depending lever arm 50, connected by a bolt 51 with a socket 52 on the underside of an upwardly swinging wheel stop 53 also pivoted in the corresponding slot 49. Each of the wheel stops 53 is also adjustably connected with the corresponding wheel rest 48 by means of an eye bolt 54, as best shown in detail in Fig. 5. By this arrangement, when the vehicle is run onto the tracks 15 with the rear wheels resting upon the wheel rest 48, the wheel stops 53 will be automatically thrown upwardly into position to stop the wheels of the vehicle, as indicated in Fig. 6, the arrangement disclosed being a simple and efficient one for the purpose.

The usual trap door 55 is provided at the rear of the dumping support to receive the dumped grain or other material, said trap door being mounted for upward swinging upon hinges 56. The trap door 55 is operated by means of a rocker shaft 57 having a crank arm 58 slidably engaging straps 59 on the top of the trap door and provided with an operating handle or lever 60, by means of which said trap door may be raised after the vehicle has been driven upon the dumping platform in the usual manner. The trap door 55 is provided with a depending stop plate 61 set in the path of a plunger 62 connected with a bell crank 63 on the underside of platform 14, said bell crank being in turn connected by a link 64 with the operating arm or handle 40. The arrangement is such that the stop plate 61 normally rests against the inner end of plunger 62 to prevent movement of said plunger and consequently of operating handle 40, when the trap door 55 is down. However, when the trap door 55 is raised, the stop plate 61 is removed and operation of handle 40 permitted to release the tracks 15 and consequently the entire dumping support. The releasing movement of handle 40 moves the plunger 62 into the path with which stop plate 61 would follow during downward movement of the trap door 55. This being so, the plunger 62 serves as a stop under these circumstances to prevent downward swinging or closing of the trap door as long as handle 40 is in position to remove the crank arms 38 from locking position. Upon operation of handle 40 to return crank arms 38 to locking positions, the plunger 62 is automatically withdrawn from the path of stop plate 61, thus permitting of the closing of the trap door to permit of the driving of vehicles onto the dumping support. By this arrangement, the driving of vehicles onto the dumping support is prevented, except when the dumping support is adequately locked to receive them.

In the modified form of construction illustrated in Figs. 11, 12 and 13, the shaft 29 is equipped with two complete gears 28' meshing with the rack bars 27, so as to permit of complete rotations of said shaft. The shaft 29 is also equipped with a ratchet 65 cooperating with a double-acting pawl 66 connected by a bell crank 66' and suitable connecting rods with an operating finger lever 67 on a main operating lever 68, and whereby shaft 26 may be rotated in either direction to force extension 17 in either direction, such arrangement being a modified form of mechanism for positioning the extension 17. In this form of application of the invention the dumping support is provided at its forward or upwardly swinging end with a depending friction or braking bar 69 operating through a braking or friction device 70, manipulated by a lever 71 connected by a link 72 with an operating arm or lever 73 located adjacent the rear or downwardly swinging end of the dumping support. The levers 39' and 40' for operating shafts 35 and 36, together with levers 73 and 68, are all provided with horizontally turned upper ends fitted within suitable recesses in the platform 14, so that the entire top of the platform presents a substantially smooth surface without material upward projections, which facilitates the driving of vehicles thereon.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A vehicle dump comprising a platform; a dumping support on said platform; means for locking said support against dumping; an operating lever for releasing said locking means; an upwardly swinging trap door at the rear of said support; and an operative connection between said lever and said trap door for preventing the closing of said trap door when said lever has been operated to release said locking means, and for preventing operation of said lever when said trap door is closed, substantially as described.

2. A vehicle dump comprising a platform; a dumping support on said platform; a shaft traversing said platform behind and below said support; means on said shaft for locking said support against dumping; an operating lever for rocking said shaft to release said support; a trap door at the rear of said support; a stop on said trap door; a plunger resting against said stop when said trap door is closed; and an operative connection between said plunger and said operating lever, substantially as described.

3. A vehicle dump comprising a platform; a dumping support on said platform; a shaft traversing said platform behind and below said support; means on said shaft for locking said support against dumping; an operating lever for rocking said shaft to release said support; a trap door at the rear of said support; a stop on said trap door; a plunger resting against said stop when said trap door is closed; and an operative connection between said plunger and said operating lever arranged to throw said plunger beyond said stop in rocking said shaft to release said support, substantially as described.

4. A vehicle dump comprising a platform; a dumping support on said platform; a shiftable extension on said support; and means for extending and retracting said extension, substantially as described.

5. A vehicle dump comprising a platform; a dumping support on said platform and having a recess therein; a shiftable extension in said recess; and means for lifting one end of said extension out of said recess and extending the same over said platform, substantially as described.

6. A vehicle dump comprising a platform; a dumping support on said platform and having a recess therein; a shiftable extension in said recess; means for lifting one end of said extension out of said recess and extending the same over said platform; and a riser at the end of said extension, substantially as described.

7. A vehicle dump comprising a platform; a dumping support on said platform and having a recess therein; a shiftable extension in said recess; means for lifting one end of said extension out of said recess and extending the same over said platform; and a foldable riser at the end of said extension, substantially as described.

8. A vehicle dump comprising a platform; a dumping support on said platform and having a recess therein; a shiftable extension in said recess; means for lifting one end of said extension out of said recess and extending the same over said platform; a foldable riser at the end of said extension; and automatic means for shifting said riser into and out of operative relation, substantially as described.

9. A vehicle dump comprising a platform; a dumping support on said platform and having a recess therein; a shiftable extension in said recess; a rack bar on the bottom of said extension; a gear on said support meshing with said rack bar; and means for operating said gear for extending said extension, substantially as described.

10. A vehicle dump comprising a platform; a dumping support on said platform and having a recess therein; a shiftable extension in said recess; a rack bar on the bottom of said extension; a gear on said support meshing with said rack bar; means for operating said gear for extending said extension; a foldable riser at the end of said extension; and automatic means for shifting said riser into and out of operative relation, substantially as described.

11. A vehicle dump comprising a platform; a dumping support on said platform and having a recess therein; a shiftable extension in said recess; a roller on said support at the end of said extension; a beveled nose on said extension adapted to ride over said roller; a rack bar on the bottom of said extension; a gear on said support meshing with said rack bar; means for operating said rack bar to extend said extension; a foldable riser at the end of said extension; and automatic means for shifting said riser into and out of operative relation, substantially as described.

12. A vehicle dump comprising a platform; a dumping support on said platform; a shiftable extension on said support, said extension having guide arms extending under said support; and means for extending and retracting said extension, substantially as described.

13. A vehicle dump comprising a platform; a dumping support on said platform; a shiftable extension on said support; and means whereby said extension may be retracted.

In testimony whereof I have signed my name to this specification in the presence of two subscribing witnesses.

CHRISTOPHER L. AYGARN.

Witnesses:
 JOSHUA R. H. POTTS,
 HELEN F. LILLIS.